Oct. 15, 1957
N. A. WESTBROOK
2,809,613
HYDRAULIC REVERSING MECHANISM
Filed Nov. 24, 1952
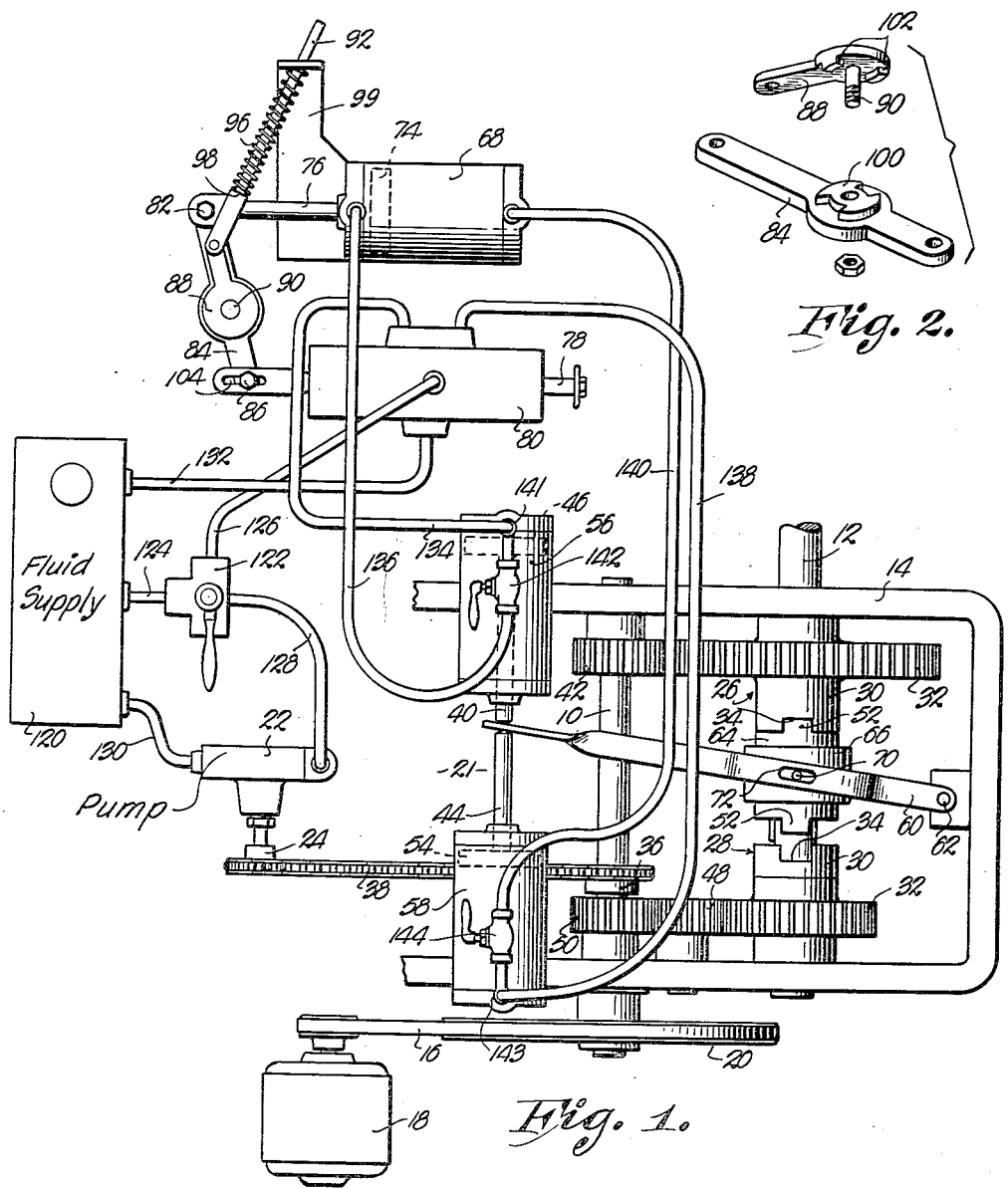
Fig. 2.
Fig. 1.
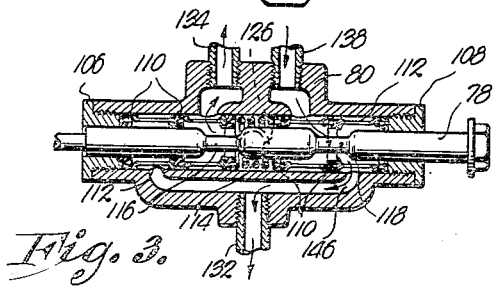
Fig. 3.
INVENTOR.
Nathanial A. Westbrook
ATTORNEY.

2,809,613
HYDRAULIC REVERSING MECHANISM
Nathanial A. Westbrook, Kansas City, Mo.
Application November 24, 1952, Serial No. 322,255
4 Claims. (Cl. 121—150)

This invention relates to a mechanical movement in the nature of reversing mechanism specifically designed for employment with such equipment as washing machines or the like, where the direction of rotation of a member thereof is to be periodically reversed as power is applied to the equipment through a constantly rotating drive shaft.

One of the important aims of my invention is to improve on the mechanical reversing mechanism of my Patent No. 2,430,627 and having means for converting power from a constantly rotating drive shaft into a force which periodically reverses the direction of rotation of a driven shaft that is operatively connected to the work.

As in my prior patent, the present invention includes the provision, in a reversing mechanism, of a pair of specially disposed clutches between which is mounted an operating element, motivated by a constantly rotating drive shaft and designed to intermittently engage the clutches with a driven shaft for the purpose of causing work to which the driven shaft is connected, to change its direction of rotation periodically and at timed intervals.

More specifically, this invention has for additional aims, to provide a unitary reversing mechanism capable of attachment to such equipment as a washing machine, and having as a part thereof, a pair of shafts, one of which is connectable to a source of power, while the other is designed for attachment to the work, which shafts have inter-related parts including fluid power means for converting constant rotation of one into periodic rotation in opposite directions of the other shaft.

Other objects and aims of the invention include the specific structure chosen to embody the many details constituting features of the invention, all of which will appear during the course of the following specification, referring to the accompanying drawing, wherein:

Fig. 1 is a schematic top plan view of my hydraulic reversing mechanism made in accordance with the present invention.

Fig. 2 is a perspective exploded view of a pair of links forming a part of the mechanism entirely removed therefrom; and Fig. 3 is a cross-sectional view of one of the valves forming a part of the mechanism entirely removed therefrom.

In the form of the invention chosen for illustration, the hydraulic reversing mechanism comprises a drive shaft 10 and a driven shaft 12, both journalled in suitable bearings forming a part of a supporting frame work, generally designated by the numeral 14.

These shafts 10 and 12 are in parallel spaced apart relation, and shaft 10 is provided with a pulley wheel or the like 20, through the medium whereof shaft 10 is attachable by belt 16 to any suitable source of power such as an electric motor 18.

Driven shaft 12 may have a sheave wheel secured thereto by means of which a belt or the like, not shown, transmits power in suitable directions of rotation to the washing machine or that part thereof to be oscillated.

A pair of clutches 26 and 28 respectively are mounted upon driven shaft 12 in spaced relation to each other and each clutch is identical in character. Each of the clutches 26 and 28 comprises a member 30, freely movable about the axis of shaft 12 and joined to a gear 32. Member 30 is drum-like in character and contains therein a number of sockets 34.

The gear 32 on member 30 of clutch 26 is in mesh with a gear 42 rigid to drive shaft 10. Gear 32 of clutch 28 meshes with an idler 48 and the latter meshes with a gear 50 on drive shaft 10, all to the end that reversal of rotation of driven shaft 12 occurs when power is shifted from clutch 26 to clutch 28 and vice versa.

Means for periodically reversing the direction of rotation of driven shaft 12 is actuated by drive shaft 10. This means comprises an arm 60 pivotally mounted as at 62 to frame 14, and a block 64 slidably, but non-rotatably, supported by driven shaft 12 between clutches 26 and 28 and having lugs 52 for sockets 34. A non-rotatable collar 66 on block 64 is reciprocable therewith and a pin 70 in collar 66 rides in a slot 72 in arm 60. Reciprocating motion is imparted to the inner end of arm 60 to cause the same to shift block 64 back and forth between clutches 26 and 28.

Pursuant to the present invention, fluid pressure supply apparatus is provided to oscillate the arm 60 about pivot 62. Such apparatus includes a prime mover, broadly designated by the numeral 21, having reciprocable structure operably connected to arm 60 for oscillating the same. A fluid pump 22 is driven by motor 18 through sprocket wheels 24 and 36 on pump 22 and shaft 10, respectively, connected by endless chain 38. The inner end of arm 60 is disposed between aligned rams 40 and 44 of prime mover 21 on pistons 46 and 54, respectively, reciprocable in cylinders 56 and 58, respectively.

Cylinders 56 and 58 are each provided with a fluid port, the reciprocable structure 40—44—46—54 being between the ports. Obviously, prime mover 21 may consist of a single cylinder having a pair of ports with a piston therebetween and a single ram operably coupled with arm 60 if desired, the piston being responsive to fluid pressure applied alternately to the ports as in the arrangement of a third cylinder 68. Cylinder 68 has a reciprocable piston 74 provided with a ram 76. Ram 76 is coupled with shiftable stem 78 of a four-way control valve 80 by a link 84 having pivot bolts 82 and 86 at the ends thereof, valve 80 being provided as a means of controlling the direction of fluid supply to the ports of cylinders 56 and 58. A link 88 swingable on link 84 by pivot bolt 90 has pivotal connection with a rod 92 that slides in a stationary bracket 99. A spring 96 is coiled around rod 92 between bracket 99 and shoulder 98 on rod 92. Interlocking jaws 100 and 102 on links 84 and 88, respectively, connect the links 84 and 88, but provide a looseness of fit so that link 88 may swing to a limited extent relative to link 84. A slot 104 in stem 78 slidably receives pivot bolt 86.

Valve 80 is provided with end bearings 106 and 108 for its stem 78, a plurality of self-sealing packers 110 and spacers 112, and a spring 114 to hold the packers 110 in sealing relationship to stem 78. Stem 78 has a pair of spaced lengths 116 and 118 of reduced diameter.

A fluid supply tank or reservoir 120 is joined with a manual valve 122 by passage 124. Pipe 126 and passage 128 join valve 122 with valve 80 and pump 22, respectively; a passage 130 joins tank 120 and pump 22; and a conduit 132 connects tank 120 with valve 80.

Lines 134 and 136 connect with cylinder 56 and lines 138 and 140 are joined to cylinder 58 by T couplings or other suitable means of connection 141—143 in the fluid ports thereof, lines 136 and 140 having shut-off valves 142 and 144, respectively, and connecting with cylinder 68, while lines 134 and 138 are joined with valve 80.

During operation, shaft 10, gears 42 and 50, pulley 20, sprocket wheels 24 and 36, chain 38 and pump 22 are driven at a constant, predetermined speed in one direction by motor 18, although any suitable speed varying means may well be provided between motor 18 and shaft 10 if desired. If valve 122 were set at neutral to circulate fluid from tank 120 to passage 130, pump 22, passage 128, valve 122 and passage 124, back to tank 120, shaft 12 would be rotated constantly and in one direction at a speed depending on the size of gear 32 on clutch 26, gear 42, pulley 20 and the pulley on the drive shaft of motor 18, all through clutch 26 when arm 60 is in the position shown by Fig. 1.

If valve 122 is moved to fully or partially close passage 124 and to fully or partially open pipe 126, when the parts are all as shown in Fig. 1, arm 60 will be swung toward clutch 28 by virtue of the following action:

Fluid flows into the valve 80 from pipe 126 and thence into line 134 where it not only flows to cylinder 56 but, by way of line 136, to cylinder 68. This causes extension of ram 40 and retraction of ram 44 to swing arm 60 to a position moving block 64 into operative engagement with clutch 28.

Simultaneously, fluid flows from cylinder 58 and, by way of line 140, to line 138, thence to valve 80 into channel 146 of valve 80, conduit 132, and into tank 120.

The flow of fluid to cylinder 68 from line 136 and the flow of fluid therefrom via line 140 retracts ram 76 to shift valve stem 78 from the position shown in Figs. 1 and 3 to the left through link 84.

Thereupon, fluid flow is from pipe 126 to valve 80 and thence into line 138 where it not only flows to cylinder 58 but, by way of line 140, to cylinder 68. This causes extension of ram 44 and retraction of ram 40 to swing arm 60 to the position moving block 64 into operative engagement with clutch 26, as shown in Fig. 1.

Simultaneously fluid flows from cylinder 56 and, by way of line 136, to line 134, thence to valve 80, into channel 146 of valve 80, conduit 132, and into tank 120.

The flow of fluid to cylinder 68 from line 140 and the flow of fluid therefrom via line 136 extends ram 76 to the position shown in Fig. 1 to shift valve stem 78 to the position shown in Figs. 1 and 3 to the right through link 84.

It is thus seen that rams 40, 44 and 76, stem 78, arm 60 and block 64 are all at one end of their respective paths of travel, as shown, when block 64 is in engagement with clutch 26, and are all at the opposite end of their respective paths of travel (not shown) when the clutch 28 operably couples shafts 10 and 12. Continuous operation of motor 18 in one direction to drive pump 22 causes reversing of the direction of rotation of shaft 12. The length of time shaft 12 rotates first in one direction and then in the opposite direction and the timing of valve 80 depends on the setting of valves 122, 142 and 144, i. e., the amount of fluid that is permitted to by-pass to tank 120 via line 124 and the amount of fluid that flows to and from cylinder 68. There is presented, therefore, means for minute adjustment of time intervals between reversing actions.

In the mechanism selected for illustration, pump 22 has been chosen to provide approximately 60 pounds pressure in the hydraulic or pneumatic system at about 900 revolutions per minute. Adjustments may be made to cause shaft 12 to rotate from 2½ to 25 revolutions in one direction before reversing and rotating a like number of revolutions in the opposite direction, depending, of course, upon the speed of rotation of shaft 12. For the most part, an initial setting of valves 142 and 144 will provide the proper timing of piston 74 and, therefore, stem 78 with pistons 46 and 54, so that a mere adjustment of valve 122 will change the time interval for reversal of shaft 12 as desired. However, the relative settings of valves 122, 144 and 146 all have a bearing on timing and reversing operations and must be determined by the operator.

When lines 138 and 140 are operating to supply fluid pressure to cylinders 58 and 68, lines 134 and 136 operate to relieve pressure of fluid in cylinders 56 and 68, respectively. Conversely, when lines 134 and 136 are operating to supply fluid pressure to cylinders 56 and 68, lines 138 and 140 operate to relieve pressure of fluid in cylinders 58 and 68, respectively.

Links 84 and 88, together with rod 92 and spring 96, present a toggle connection between ram 76 and stem 78, affording a snap action movement of stem 78 each time ram 76 is extended and retracted. Rod 92 is shown in Fig. 1 to one side of center and it is obvious that when ram 76 is retracted, rod 92 will be disposed to the opposite side of center, the limited swinging movement of link 88 relative to link 84 contributing to the effectiveness of the snap action. This mechanism, therefore, which includes cylinder 68 and piston 74, provides the means for shifting stem 78 alternately in opposite directions during continuous operation of motor 18.

Having thus described the invention, what is claimed as new and desired to be secured by Letters Patent is:

1. In reversing mechanism of the kind having a swingable arm, the combination of a pair of opposed, hydraulic cylinders provided with reciprocable pistons having rams extending inwardly from the proximal, innermost ends thereof and engageable with opposite faces of the arm for swinging the latter as the pistons reciprocate together as a unit; a four-way valve unit provided with a body; a fluid supply pipe and a fluid discharge pipe connected with said body, said supply pipe being adapted for connection with a source of hydraulic fluid under pressure; a tubular line connecting the body with the outermost end of each cylinder respectively; a reciprocable valve in the body for coupling the supply pipe with one of the lines and the discharge pipe with the other line when the valve is at one end of its path of travel and for coupling said discharge pipe with said one line and said supply pipe with said other line when the valve is at the opposite end of its path of travel, whereby to reciprocate the pistons; means for controlling said valve unit including a double-acting, hydraulic, piston-cylinder assembly having the piston thereof provided with a stem and the cylinder thereof provided with a conduit at each of its ends, each conduit being connected with a corresponding line for alternately receiving fluid from, and discharging the same to, said lines as the valve reciprocates whereby said stem is reciprocated; linkage operably connecting said stem with said valve for reciprocating the latter as the stem reciprocates; and valve means in each of said conduits respectively for controlling the flow of fluid to and from the cylinder of said assembly.

2. In reversing mechanism as set forth in claim 1 wherein is provided snap-action mechanism coupled with said linkage for accelerating the movement of said valve as it approaches each end of its reciprocable path of travel.

3. In reversing mechanism as set forth in claim 2 wherein said linkage includes a first link pivotally interconnecting the stem and the valve, a second link pivotally interconnecting said mechanism and said first link, and stop means on the links for limiting the extent of relative swinging movement thereof.

4. In reversing mechanism as set forth in claim 1 wherein is provided valve means in said supply pipe for controlling the flow of fluid from said source.

References Cited in the file of this patent

UNITED STATES PATENTS

| 303,705 | Carricaburu | Aug. 19, 1884 |
| 1,077,354 | Lemay | Nov. 4, 1913 |
| 2,169,089 | Davenport | Aug. 8, 1939 |
| 2,282,977 | Mast | May 12, 1942 |
| 2,298,457 | Berges | Oct. 13, 1942 |
| 2,302,232 | MacNeil | Nov. 17, 1942 |
| 2,430,627 | Westbrook | Nov. 11, 1947 |
| 2,550,723 | Ross | May 1, 1951 |

FOREIGN PATENTS

| 466,400 | Great Britain | May 27, 1937 |